United States Patent [19]

Traenckner et al.

[11] 4,112,018

[45] Sep. 5, 1978

[54] UNSATURATED POLYESTER RESINS SUITABLE FOR THE PRODUCTION OF CROSS-LINKED POLYESTERS WHICH ARE DIFFICULT TO SAPONIFY

[75] Inventors: Hans-Joachim Traenckner, Krefeld-Fischeln; Hans Jurgen Rosenkranz, Krefeld; Hans-Michael Fischler, Krefeld; Erich Eimers, Krefeld, all of Fed. Rep. of Germany

[73] Assignee: Bayer Aktiengesellschaft, Fed. Rep. of Germany

[21] Appl. No.: 718,531

[22] Filed: Aug. 30, 1976

Related U.S. Application Data

[63] Continuation of Ser. No. 581,805, May 29, 1975, abandoned.

[30] Foreign Application Priority Data

Jun. 6, 1974 [DE] Fed. Rep. of Germany ....... 2427275

[51] Int. Cl.$^2$ ..................... C08G 63/52; C08G 63/56; C08L 67/06
[52] U.S. Cl. ............... 260/861; 260/33.6 R; 260/22 CB; 260/863; 260/864; 260/866; 260/869; 260/872; 260/40 R
[58] Field of Search ................ 260/75 UA, 861, 872, 260/863, 864, 866, 872

[56] References Cited

U.S. PATENT DOCUMENTS

| | | | |
|---|---|---|---|
| 3,194,791 | 7/1965 | Wilson et al. | 260/75 |
| 3,304,347 | 2/1967 | McGary et al. | 260/861 |
| 3,560,445 | 2/1971 | Fekete et al. | 260/861 |
| 3,740,372 | 6/1973 | Baum et al. | 260/861 |
| 3,896,098 | 7/1975 | Lasher | 260/861 |
| 4,038,340 | 7/1977 | Frank et al. | 260/861 |

FOREIGN PATENT DOCUMENTS

| | | |
|---|---|---|
| 1,024,654 | 2/1958 | Fed. Rep. of Germany. |
| 1,029,147 | 4/1958 | Fed. Rep. of Germany. |
| 1,105,160 | 4/1961 | Fed. Rep. of Germany. |
| 2,301,691 | 8/1974 | Fed. Rep. of Germany. |
| 2,360,710 | 6/1975 | Fed. Rep. of Germany. |
| 2,427,275 | 12/1975 | Fed. Rep. of Germany. |

OTHER PUBLICATIONS

Chem. Abstracts, vol. 85, 1976, 48424y, Dhein et al.

*Primary Examiner*—Howard E. Schain
*Attorney, Agent, or Firm*—Connolly and Hutz

[57] ABSTRACT

Unsaturated polyester resins which are suitable for the production of cross-linked polyesters which are with difficulty to saponify contain, in part at least, radicals of 2-alkyl-1.3-propane diols as the alcohol component.

2 Claims, No Drawings

UNSATURATED POLYESTER RESINS SUITABLE FOR THE PRODUCTION OF CROSS-LINKED POLYESTERS WHICH ARE DIFFICULT TO SAPONIFY

CROSS-REFERENCE TO RELATED APPLICATION

This application is a continuation of application Ser. No. 581,805 filed May 29, 1975 and now abandoned.

This invention relates to unsaturated polyester resins containing, in part at least, radicals of 2-alkyl-1,3-propane diols as the alcohol component.

Mouldings and coatings of the type which can be obtained by hardening moulding compositions based on unsaturated polyesters and copolymerisable monomers, are generally exposed to all kinds of stressing in practice. One measure of their resistance to chemicals is their hydrolysability. The resistance of the cured products to water and aqueous liquors, which imposes severe demands upon the material especially at elevated temperatures, is governed to a considerable extent by the type of polyester components.

It has already been proposed to produce polyesters having an improved resistance to hydrolysis by using branched aliphatic diols of the formula

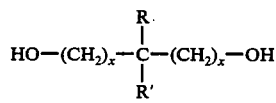

in which

R and R' represent alkyl or cycloalkyl radicals, and x is an integer from 1 to 6 (German Auslegeschrift No. 1,029,147), or of the formula

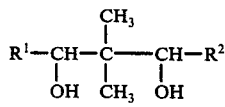

in which $R^1$ is an alkyl radical having at least 2 carbon atoms, a cycloalkyl or aryl radical, and $R^2$ is an alkyl, cycloalkyl or aryl radical or a hydrogen atom (German Auslegeschrift No. 1,105,160).

According to the aforementioned Patent Specifications, particularly suitable diols are 3,3-diethyl-1,5-pentane diol, 2,2-bis-cyclohexyl-1,3-propane diol, 2,2-dimethyl-1,3-propane diol, 2,2-dimethyl-1,3-hexane diol and 2,2,4-trimethyl-1,3-pentane diol.

Where the diols used are those described in German Auslegeschrift No. 1,029,147, they may be esterified relatively easily by the conventional melt condensation process owing to their primary alcohol groups. However, they are attended by the disadvantage of extreme volatility. Approximately 15% by weight of the diol used distils off together with the water of reaction unless technically very complicated partial condensers are used.

Accordingly, the object of the invention is to provide unsaturated polyester resins based on such polyesters which, in addition to radicals of α,β-ethylenically unsaturated dicarboxylic acids and, optionally, conventional diols, contain radicals of alcohol components of the type which are distinguished by low volatility but which nevertheless are responsible for a high level of resistance to hydrolysis in polyester-resin mouldings or coatings after they have been hardened.

It has been found that cured polyesters containing radicals of diols corresponding to the formula

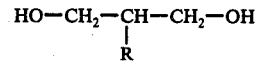

in which

R is an alkyl radical having 1 to 6 carbon atoms or a cyclohexyl radical, are, surprisingly, at least as difficult to hydrolyse as cured polyesters containing radicals of 2,2-dialkyl-1,3-propane diols. Experts could have expected that the attack of the hydroxyl ion upon the carbon atom of the ester carbonyl group would be less complicated by the absence of one of the 2-position alkyl groups than by the presence of two 2-position alkyl groups, which should be reflected in a higher rate of hydrolysis of the polyester resins.

Accordingly, the invention relates to unsaturated polyester resins suitable for the production of cross-linked polyesters which are difficult to saponify and which contain, optionally with the addition of usual quantities of polymerisation initiators and inhibitors, I. from 40 to 90% by weight, preferably from 50 to 70% by weight, of an unsaturated polyester which in turn consists of
  (a) 30 to 80% by weight of radicals of α,β-ethylenically unsaturated dicarboxylic acids, of which up to 70 mol % may be replaced by radicals of aromatic, cycloaliphatic or saturated aliphatic dicarboxylic acids and up to 10 mol % by monofunctional or trifunctional carboxylic acids,
  (b) from 20 to 70% by weight of radicals of 2-alkyl-1,3-propane diols, the alkyl groups optionally containing from 1 to 6 carbon atoms or consisting of a cyclohexyl radical,
  (c) 0 to 50% by weight of radicals of other diol components, and II. from 10 to 60% by weight and preferably from 20 to 50% by weight of copolymerisable compounds. One particularly suitable diol is 2-ethyl-1,3-propane diol.

The unsaturated polyesters I used in accordance with the invention are obtained by known methods by polycondensing at least one α,β-ethylenically unsaturated dicarboxylic acid according to I (a) or its ester-forming derivatives optionally in admixture with up to 70 mol %, based on the total acid component, of at least one aromatic, cycloaliphatic or saturated aliphatic dicarboxylic acid or its ester-forming derivatives with at least one dihydric alcohol. Examples of preferred unsaturated dicarboxylic acids, or derivatives thereof, are maleic acid or maleic acid anhydride and fumaric acid. However, it is also possible to use, for example, mesaconic acid, citraconic acid and itaconic acid. Examples of the aromatic, cycloaliphatic or saturated aliphatic dicarboxylic acids used, or their derivatives, are phthalic acid or phthalic acid anhydride, isophthalic acid, terephthalic acid, hexahydrophthalic or tetrahydrophthalic acid or their anhydrides, endomethylene tetrahydrophthalic acid or its anhydride, succinic acid or succinic acid anhydride and succinic acid esters and chlorides, glutaric acid, adipic acid, sebacic acid, trimellitic acid. In order to obtain substantially non-inflammable resins, it is possible to use for example hexachloroendomethylene tetrahydrophthalic acid (het acid), tetrachlorophthalic acid or tetrabromophthalic acid. Non-inflammability can also be obtained by adding halogen-containing compounds which are not condensed in the polyester, such as chloroparaffin for example. Preferred polyesters I contain maleic acid units of which up to 70 mol % may be replaced by phthalic acid or isophthalic acid units. Diols according to I (c) include alkylene glycol, 1,2-propane diol, 1,3-propane diol, diethylene, triethylene and tetraethylene glycol, dipropylene glycol, 1,3-butane diol, 1,4-butane diol, neopentyl glycol, 1,6-hexane diol, 1,2-cyclohexane diol, 1,4-bis-hydroxy methyl cyclohexane and others.

Further modifications may be made by incorporating up to 10 mol %, based on the alcohol or acid component, of monohydric or polyhydric alcohols such as butanol, benzyl alcohol, cyclohexanol and tetrahydrofurfuryl alcohol, trimethylol propane and pentaerythritol, and also monoallyl, diallyl and triallyl ethers and benzyl ethers of trihydric and polyhydric alcohols in accordance with German Auslegeschrift No. 1,024,654, and by incorporating monobasic acids such as benzoic acid, oleic acid, linseed oil fatty acid and ricinene fatty acid.

The polyesters I should have acid numbers in the range from 1 to 50, preferably in the range from 5 to 25, OH-numbers in the range from 10 to 100, preferably in the range from 20 to 50, and molecular weights $M_n$ in the range from about 500 to 10,000, preferably from about 700 to 3,000 measured by vapour pressure osmosis in dioxane and acetone; if the obtained values differ from one another, the lower one is considered to be correct.

Copolymerisable compounds II suitable for the purposes of the invention include the unsaturated compounds normally encountered in polyester technology which preferably contain α-substituted vinyl groups or β-substituted allyl groups, preferably styrene. However, it is also possible to use, for example, nucleus-chlorinated and nucleus-alkylated styrenes, in which case the alkyl groups may contain from 1 to 4 carbon atoms, such as for example vinyl toluene, divinyl benzene, α-methyl styrene, tert.-butyl styrene, chlorostyrenes; vinyl esters of carboxylic acids containing from 2 to 6 carbon atoms, preferably vinyl acetate; vinyl pyridine, vinyl naphthalene, vinyl cyclohexane, acrylic acid and methacrylic acid and/or their esters having 1 to 4 carbon atoms in the alcohol component, their amides and nitriles, maleic acid anhydride, -semiesters and -diesters having from 1 to 4 carbon atoms in the alcohol component, -semiamides and -diamides or cyclic imides such as N-methyl maleic imide or N-cyclohexyl maleic imide; allyl compounds such as allyl benzene and allyl esters such as allyl acetate, allyl acrylate, allyl methacrylate, phthalic acid diallyl ester, isophthalic acid diallyl ester, fumaric acid diallyl ester, allyl carbonates, diallyl carbonates, triallyl phosphate and triallyl cyanurate.

The unsaturated polyesters I may be obtained by the conventional methods of melt condensation or azeotropic esterification.

In order to protect the polyester resins according to the invention against undesirable premature polymerisation, it is advisable to add from 0.001 to 0.1% by weight, based on the sum total of components I and II of polymerisation inhibitors or antioxidants to the resins during their production. Suitable additives of this kind are, for example, phenols and phenol derivatives, preferably sterically hindered phenols which contain alkyl substituents having 1 to 6 carbon atoms in both o-positions to the phenolic hydroxy group, amines, preferably secondary aryl amines and derivatives thereof, quinones, copper salts of organic acids, addition compounds of copper (I) halides with phosphites, such as for example 4,4'-bis-(2,6-di-tert.-butyl phenol), 1,3,5-trimethyl-2,4,6-tris-(3,5-di-tert.-butyl-4-hydroxy benzyl)-benzene, 4,4'-butylidene-bis-(6-tert.-butyl-m-cresol), 3,5-di-tert.-butyl-4-hydroxy benzyl phosphonic acid diethyl ester, N,N'-bis-(β-naphthyl)-p-phenylene diamine, N,N'-bis-(1-methyl heptyl)-p-phenylene diamine, phenyl-β-naphthyl amine, 4,4'-bis-(α,α-dimethyl benzyl)-diphenyl amine, 1,3,5-tris-(3,5-di-tert.-butyl-4-hydroxy hydrocinnamoyl)-hexahydro-s-triazine, hydroquinone, p-benzoquinone, toluhydroquinone, p-tert.-butyl pyrocatechol, 3-methyl pyrocatechol, chloranil, naphthoquinone, copper naphthenate, copper octoate, Cu(I)Cl/triphenyl phosphite, Cu(I)Cl/trimethyl phosphite, Cu(I)Cl/tris-chloroethyl phosphite, Cu-(I)Cl/tripropyl phosphite and p-nitrosodimethyl aniline. Other suitable stabilisers are described in "Methoden der organischen Chemie" (Houben Weyl), 4th Edition, vol XIV/1, pages 433 to 452, 756, Georg Thieme Verlag, Stuttgart, 1961. p-Benzoquinone for example is particularly suitable in a concentration of from 0.01 to 0.05% by weight, based on the sum total of components I and II.

The polyester resins according to the invention contain usual quantities, preferably from 1.0 to 5.0% by weight, based on the sum total of components I and II, of polymerisation initiators such as, for example, diacyl peroxides such as diacetyl peroxide, dibenzoyl peroxide, di-p-chlorobenzoyl peroxide, peroxy esters such as tert.-butyl peroxy acetate, tert.-butyl peroxy benzoate, dicyclohexyl peroxy dicarbonate, alkyl peroxides such as bis-(tert.-butyl peroxy butane), dicumyl peroxide, tert.-butyl-cumyl peroxide, hydroperoxides such as cumene hydroperoxide, tert.-butyl hydroperoxide, cyclohexanone hydroperoxide, methyl ethyl ketone hydroperoxide, ketone peroxides as acetyl acetone peroxide, or azoisobutyrodinitrile.

Chemical thickeners may be added in quantities of from 0.1 to 10% by weight and preferably in quantities of from 0.5 to 5.0% by weight, based on the sum total of components I and II. Chemical thickeners are the oxides and hydroxides of metals of the Second Main Group of the periodic system, especially magnesium and calcium, to which small quantities of water may optionally be added.

In addition, up to 300% by weight, preferably from 50 to 200% by weight, based on the sum total of components I and II of fillers may be added to the polyester resins according to the invention. Suitable fillers include inorganic materials, such as calcium carbonate, silicates, aluminas, lime carbon, asbestos, preferably glass, generally in the form of powders, fibres, woven fabrics or matts, and organic fillers such as cotton, sisal, jute, polyester, polyamide, again in the form of fibres or woven fabrics.

In addition, inorganic or organic pigments, dyes, lubricants and release agents, such as zinc stearate, UV-absorbers, etc., may of course be added in the usual quantities if desired.

The polyester resins according to the invention are distinguished not only by the high resistance to hydrolysis of the mouldings and coatings produced from them, but also (in comparison with resins containing, instead of 2-alkyl-1,3-propane diols, the comparable 2,2-methyl-1,3-propane diol) by their at least equivalent but, in most cases, improved mechanical properties, for example their improved tensile strength and higher modulus of elasticity.

EXAMPLE 1

A polyester, obtained from 794.25 parts by weight of maleic acid anhydride, 1022.0 parts by weight of phthalic acid anhydride, 251.13 parts by weight of 1,2-propane diol and 1367.2 parts by weight of 2-ethyl-1,3-propane diol by melt condensation in the usual way was dissolved to form a 60% by weight solution in styrene, followed by stabilisation with 4.6 parts by weight of hydroquinone.

The resin obtained has an acid number of 10,5 and a viscosity corresponding to a flowout time of 47 seconds, as measured in a DIN-4-cup at 20° C in accordance with DIN 53 211.

98 parts by weight of this unsaturated polyester resin were mixed with 2 parts by weight of benzoyl peroxide paste (50% by weight solution in dibutyl phthalate), and hardened for 3 hours at 75° C in the form of a 2mm thick layer cast between two plates of glass. Test specimens measuring 40 × 80 mm were punched out after tempering for 15 hours at 100° C. These test specimens were stored at 100° C in 10% by weight NaOH-solution, the hydrolysed polyester layer was scratched off after 7 days and the weight loss determined by weighing. Weight of two different test specimens:

| Test specimen | 0 | 1 | 14 | 21 | 28 | 35 | 42 days |
|---|---|---|---|---|---|---|---|
| 1 | 1.67 | 1.67 | 1.66 | 1.50 | 1.48 | 1.33 | x) |
| 2 | 1.67 | 1.68 | 1.65 | 1.52 | 1.51 | 1.37 | 1.30 | x)means test specimen destroyed

Comparison Example 1

The procedure was as in Example 1, except that the 2-ethyl-1,3-propane diol was replaced by the same quantity of 2,2-dimethyl-1,3-propane diol. The resin obtained had an acid number of 28 and a viscosity corresponding to a flowout time of 48 seconds, as measured in a DIN-4-cup at 20° C in accordance with DIN 53 211.

Weight of two different test specimens:

| Test specimen | 0 | 1 | 14 | 21 | 28 | 35 | 42 days |
|---|---|---|---|---|---|---|---|
| 1 | 1.66 | 1.63 | 1.38 | 1.20x) | | | |
| 2 | 1.67 | 1.64 | 1.35 | 1.18x) | | | | x)test specimen destroyed

EXAMPLE 2

A polyester, obtained from 882.5 parts by weight of maleic acid anhydride, 888.6 parts by weight of phthalic acid anhydride and 1575.0 parts by weight of 2-ethyl-1,3-propane diol by melt condensation in the usual way, was dissolved to form a 60% by weight solution in styrene, followed by stabilisation with 4.8 parts by weight of hydroquinone.

The resin obtained had an acid number of 16,2 and a viscosity corresponding to a flowout time of 46 seconds, as measured in a DIN-4-cup at 20° C in accordance with DIN 53 211.

The weight loss produced by hydrolysis was determined in accordance with Example 1.

Weight of two different test specimens:

| Test specimen | 0 | 1 | 14 | 21 | 28 | 35 | 42 days |
|---|---|---|---|---|---|---|---|
| 1 | 1.72 | 1.72 | 1.70 | 1.65 | 1.60 | 1.52 | 1.45 |
| 2 | 1.72 | 1.75 | 1.68 | 1.64 | 1.58 | 1.52 | 1.44 |

Comparison Example 2

The procedure was as in Example 2, except that the 2-ethyl-1,3-propane diol was replaced by the same quantity of 2,2-dimethyl-1,3-propane diol. The resin obtained had an acid number of 29 and a viscosity corresponding to a flowout time of 46 seconds, as measured in a DIN-4-cup at 20° C in accordance with DIN 53 211. The weight loss produced by hydrolysis was determined in the same way as described above.

Weight of two different test specimens:

| Test specimen | 0 | 1 | 14 | 21 | 28 | 35 days |
|---|---|---|---|---|---|---|
| 1 | 1.68 | 1.69 | 1.65 | 1.54 | 1.35 | |
| 2 | 1.68 | 1.68 | 1.64 | 1.53 | x) | | x)test specimen destroyed

EXAMPLE 3

A polyester obtained from 581 parts by weight of maleic acid anhydride, 2710 parts by weight of tetrahydrophthalic acid anhydride and 2615 parts by weight of 2-ethyl-1,3-propane diol by melt condensation in the usual way, was dissolved to form a 66% by weight solution in styrene, followed by stabilisation with 0.825 parts by weight of hydroquinone. The cast-resin solution has a viscosity of 1250 cP, as measured at 20° C in accordance with DIN 53 015, and an acid number of 12 (mg of KOH/g of substance). Mouldings with the following mechanical properties were obtained after hardening in the same way as in Example 1:

| 1) Tensile test: | Stretching tension (DIN 53 455) | 26.7 MPa |
|---|---|---|
| | Stretching elongation (DIN 53 455) | 3.8% |
| | Tensile strength (DIN 53 455) | 22.4 MPa |
| | Elongation at break (DIN 53 455) | 31.4% |
| | E-Modulus (DIN 53 457) | 1.8 CPa |
| 2) Bending test: | Bending strength (DIN 53 452) | 34.8 MPa |
| | Sag (DIN 53 452) | 6 mm |

Comparison Example 3

The procedure was as in Example 3, except that the 2-ethyl-1,3-propane diol was replaced by the same quantity of 2,2-dimethyl-1,3-propane diol. The cast resin solution obtained has a viscosity of 1195 cP, as measured at 20° C in accordance with DIN 53 015, and an acid number of 14 (mg of KOH/g of substance). Mouldings having the following mechanical properties were obtained after hardening in the same way as in Example 1:

| 1) Tensile test: | Stretching tension | 26.5 MPa |
|---|---|---|
| | Stretching elongation | 3.9% |
| | Tensile strength | 21.6 MPa |

|  |  |  |
|---|---|---|
|  | Elongation at break | 31.8% |
|  | E-modulus | 1.6 GPa |
| 2) Bending test: | Bending strength | 34.7 MPa |
|  | Sag | 6 mm |

The test conditions were the same as in Example 3.

We claim:

1. Unsaturated polyester resins suitable for the production of cross-linked polyesters which are difficult to saponify containing
   I. from 40 to 90% by weight of an unsaturated polyester which in turn consists of
      (a) from 30 to 80% by weight of radicals of α,β-ethylenically unsaturated dicarboxylic acids, of which up to 70 mol % may be replaced by radicals of saturated dicarboxylic acids and up to 10 mol % by monofunctional or trifunctional carboxylic acids,
      (b) from 20 to 70% by weight of radicals of 2-ethyl-1,3-propane diol, and
      (c) from 0 to 50% by weight of radicals of other diol components, of which up to 10 mol % may be replaced by monohydric or trihydric alcohols, and
   II. from 10 to 60% by weight of copolymerisable compounds.

2. The unsaturated polyester resins of claim 1 in admixture with at least one member selected from the group consisting of polymerization initiators and inhibitors.

* * * * *